United States Patent [19]

Ralls

[11] Patent Number: 4,609,209
[45] Date of Patent: Sep. 2, 1986

[54] PRECISE ALIGNMENT ADAPTER FLANGE

[75] Inventor: Gene R. Ralls, Tulsa, Okla.

[73] Assignee: T. D. Williamson, Inc., Tulsa, Okla.

[21] Appl. No.: 549,156

[22] Filed: Nov. 7, 1983

[51] Int. Cl.⁴ .............................................. F16L 35/00
[52] U.S. Cl. ...................................... 285/24; 285/347; 285/365
[58] Field of Search ................... 285/24, 27, 25, 26, 285/28, 29, 347, 365, 409

[56] References Cited

U.S. PATENT DOCUMENTS

| | | | |
|---|---|---|---|
| 1,603,412 | 10/1926 | Rohde | 285/409 |
| 1,782,484 | 11/1930 | Spencer et al. | 285/DIG. 7 X |
| 3,848,421 | 11/1974 | O'Brien et al. | 285/24 X |
| 4,209,891 | 7/1980 | Lamb et al. | 285/24 X |
| 4,408,929 | 10/1983 | Baugh | 285/26 X |
| 4,411,454 | 10/1983 | Nayler | 285/26 |

Primary Examiner—Dave W. Arola
Attorney, Agent, or Firm—Head, Johnson & Stevenson

[57] ABSTRACT

An adapter flange by which precise alignment may be achieved including a tubular member having a first alignment plate affixed to the exterior surface in a plane perpendicular to the tubular axis and having spaced apart openings adjacent to the plate peripheral edge, a flange member and a clamping apparatus by which the flange member may be sealably connected to the tubular member, a second alignment plate affixed to the exterior peripheral surface of the flange member perpendicular its tubular axis, and alignment bars extending from the second alignment flange to engage openings in the first alignment flange when the flange is oriented precisely relative to the tubular member so that a workman attaching the flange to the tubular member is assured of the exact orientation of the flange and tubular member.

3 Claims, 8 Drawing Figures

PRECISE ALIGNMENT ADAPTER FLANGE

SUMMARY OF THE INVENTION

In recent years much of the petroleum exploration and development on the earth has been accomplished in the seas surrounding the land areas. When an offshore well is completed, means must be provided for movement of the produced product to the land areas for refining and ultimate consumption. For this reason, many pipelines have been laid on the ocean floor extending from offshore wells to adjacent land areas.

It is sometimes necessary to perform work on a pipeline on the ocean floor after the pipeline has been installed and in operation. This can be accomplished by attaching a fitting to the exterior of the line and cutting an opening in the line. One difficult problem in working with pipelines under water is that the workmen must operate with very limited visibility. For this reason, a tubular member extending from a pipeline can be used to attach devices to the pipeline but the operator is sometimes unsure as to the alignment of the device accurately with the pipeline itself. Some types of devices, such as those used to plug or close off a pipeline must be accurately aligned relative to the longitudinal cylindrical axis of the pipeline for effective operation.

Another difficulty with underwater pipelines of the type described is that when an apparatus is attached to a pipeline in an underwater location and it becomes necessary to close or seal off the opening formed in the line, it is difficult for workmen to actuate or operate mechanisms to form the closing function. The present invention provides a mechanism for enabling an operator working in restricted visibility, to accurately attach devices to the pipeline with precise alignment and to provide a means of sealing or closing off the tubular member connected to the pipeline under adverse environmental conditions, such as experienced in working under water.

The present invention solves these problems by providing an adapter flange including a first tubular member having a first alignment plate affixed to the exterior surface, the plate having spaced apart openings adjacent the peripheral edge. A flange member is provided having a clamping apparatus by which the flange member may be sealably connected to the tubular member. A second alignment plate is affixed to the flange member. Alignment bars extend from the second alignment plate to engage openings in the first alignment plate when the flange is aligned precisely with the tubular member. In this manner, a workman attaching the flange to the tubular member is assured of the exact orientation of the flange and tubular member.

DETAILED DESCRIPTION OF THE PREFERRED EMBODIMENT

Figure 1:
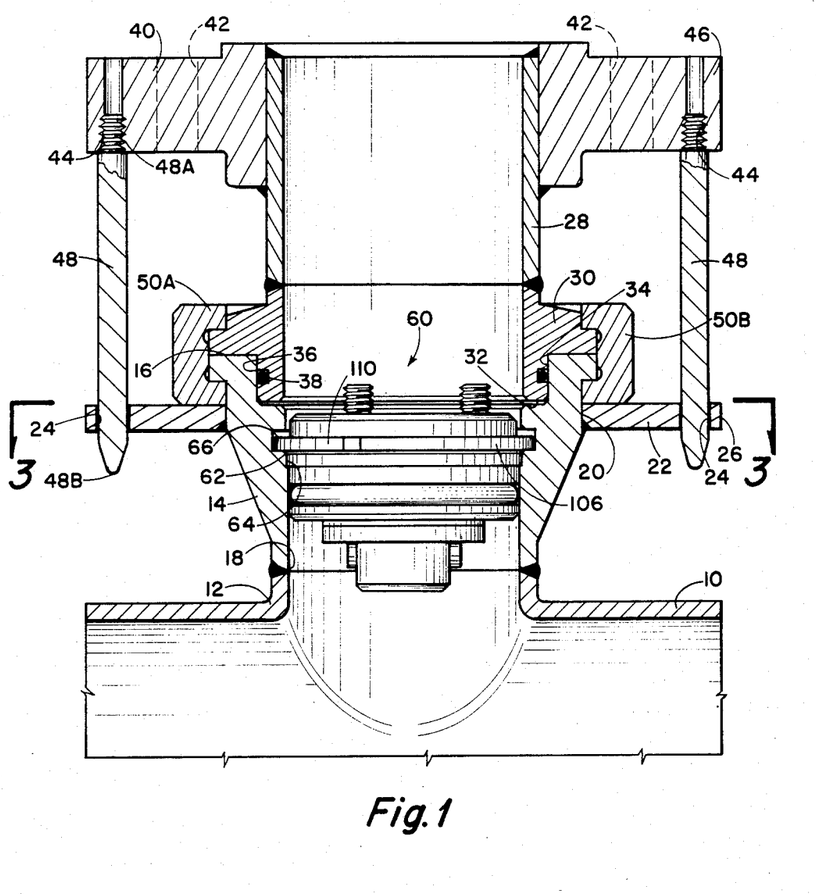
FIG. 1. is an elevational cross-sectional view of one embodiment of a precise alignment adapter flange of this invention and an external view of a removable plugging apparatus.
Figure 2:
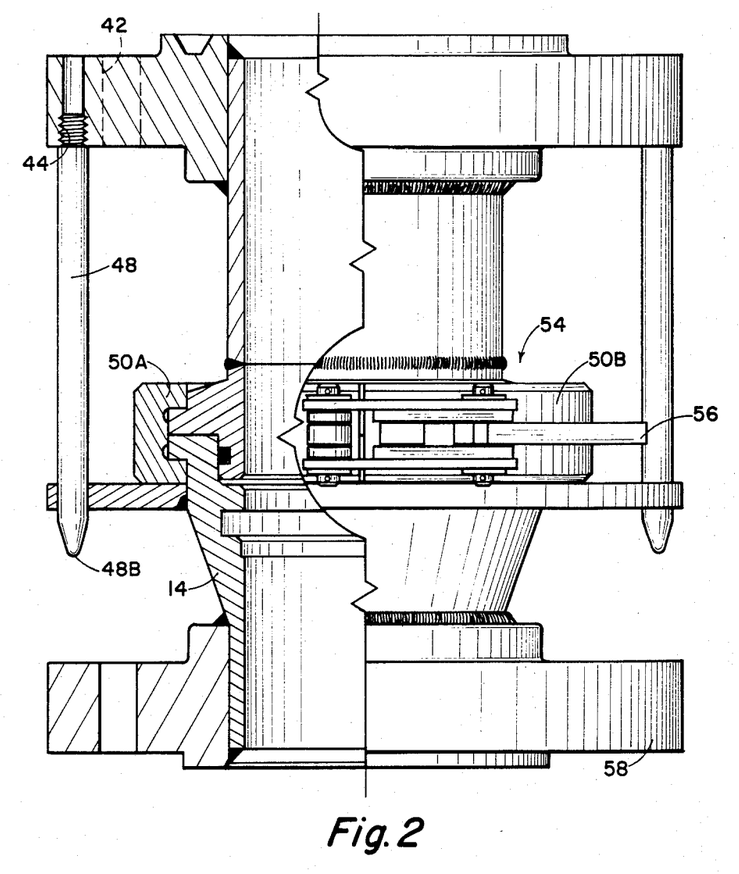
FIG. 2. is a partial cross-sectional view of the embodiment of FIG. 1 showing a partial external view of the precise alignment adapter flange.
Figure 3:
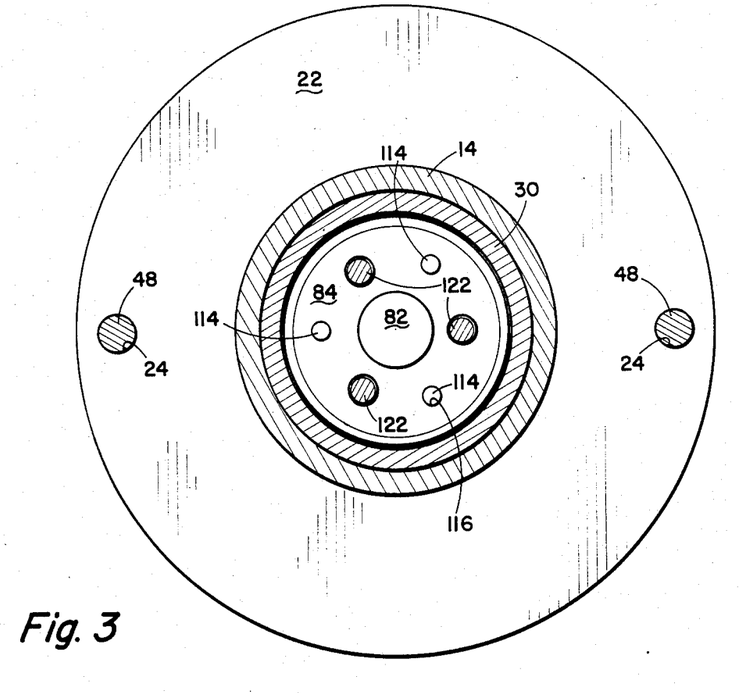
FIG. 3 is a cross-sectional view taken along the line 3—3 of FIG. 1.

Referring first to FIGS. 1, 2 and 3, a first type of the precise alignment adapter flange of this invention is shown. A saddle member 10, for attachment to a pipeline, has a drawn branch opening 12. Secured to the branch openings 12 is a first tubular flange member 14. This facility may be located in an area of greatly reduced visibility, such as on the ocean floor of a pipeline extending from an offshore production site. When apparatus is attached to the first tubular flange member 14 it may be necessary that the operator accurately know the alignment of the apparatus relative to the pipeline to which it is attached. While in aboveground operation with good visibility such alignment can usually be ascertained sufficiently by visual observation, in underwater locations with reduced visibility and greatly reduced mobility of the operator, the accurate alignment of devices attached to the first tubular flange member 14 may be extremely difficult. The present invention provides a means of accomplishing such accurate alignment.

The first tubular flange member 14 has an open end 16 and a cylindrical interior surface 18. Affixed to the exterior cylindrical surface of the first tubular flange member 14 is a first alignment plate 22. The plane of plate 22 is perpendicular the tubular axis of the flange members cylindrical interior surface 18 and the first alignment plate 22 has openings 24 spaced adjacent its external peripherial edge 26.

A second tubular member 28 has a second tubular flange portion 30 affixed to it which has an opened lower end 32 and is configured to engage the open upper end of the first tubular flange member 14. In the illustrated arrangement the upper flange member 14 has an enlarged internal diameter portion 34 communicating with the upper end 16 and the second flange portion 30 has a reduced external diameter portion 36 so that these portions are matingly received. By means of a groove formed in the surface 36, an O-Ring gasket 38 forms a sealed relationship between the first and second flange members 14, 30.

As heretofore mentioned, a basic problem with the installation of an apparatus such as a plugging machine, which needs to be directionally oriented relative to a pipeline is that of establishing the orientation of the second tubular member 28 with the pipeline. For this purpose, a second alignment plate 40 is secured to the second tubular member 28. In the arrangement illustrated in FIG. 1 the second alignment plate 40 is in the form of a typical flange member which can be secured to another member by means of bolts (not shown) extending through openings 42.

The second alignment plate 40 has threaded openings 44 adjacent the outer periphery 46 of the member. Secured in the threaded openings 44 are elongated alignment bars 48. These bars may be cylindrical members with integral threaded ends 48A received in threaded openings 44. The opposite ends are preferably pointed at 48B to facilitate extending the alignment bars through the openings 24 in first alignment plate 22.

The threaded openings 44 in second alignment plate 40 match the openings 24 in first alignment plate 22; and the orientation of the openings in both alignment plates may be asymmetrical, such as illustrated in FIG. 3, so that the second tubular member 28 can be received on the first tubular member 14 in only one orientation. As an alternative, the openings 24 may be two in number spaced 180° apart corresponding to two openings 44 in second alignment plate 40 which will enable the second tubular member 28 to be aligned in only two positions relative to the first tubular member. In some instances, such two-position arrangement is satisfactory since the operator will know generally the orientation desired and the operator will be able to secure the proper orientation of the second tubular member 28 relative to the first tubular member 14 without difficulty.

After the second tubular member 28, with its alignment plate 40 and integral second tubular flange portion 30 forming a part thereof, is positioned on and within the first tubular flange member 14, it is necessary that these elements be secured in a pressure sealed relationship. Since the present invention is specifically arranged to function in a limited visibility environments it is important that this be achieved with a minimum of precision work on the part of the workman making the installation. For this purpose, a clamp ring assembly 50 may be secured around the flange portions 14 and 30. The clamp ring has a C shaped internal circumferential cross-sectional configuration which grips extending lip portions of the members 14 and 30 so that when it is in secured position, as illustrated, these portions are held together against internal pressure. The clamp ring is preferably formed of two portions with a hinge 52 on one side and a toggle clamping mechanism 54 (see FIG. 2) on the other side. The toggle clamping mechanism includes a clamp handle 56 which, when in the locked position, closes the clamp ring assembly around the adapter. The toggle clamping mechanism is illustrative of one means of securing the tubular members 14 and 22 to each other in a way which can be accomplished without alignment of bolts or threading nuts in position.

FIG. 2 shows a partial view of the mechanism in which the first tubular member 14 is affixed to a lower flange 58 rather than directly to a pipeline or other vessel, illustrative of the fact that the precise alignment adapter flange may be employed in connection with a variety of devices to which it may be attached.

In most instances when equipment is secured to an operating pipeline some apparatus must be employed for closing off the opening. For instance, referring again to FIG. 1, the cylindrical interior surface 18 must be closed against the passage of gas or fluid from within when the apparatus which otherwise closes the interior of second tubular member 28, which normally is attached to the second alignment plate 40, is removed. For this purpose a removable plugging apparatus, generally indicated by the numeral 60, is employed. The internal surface 18 of the first tubular flange member has a reduced diameter portion 62 in the upper end providing an internal circumferential ledge 64. In the reduced internal diameter portion 62 is an enlarged internal diameter groove 66. The removable plugging 60 makes use of ledge 64 and groove 66.

Figure 4:
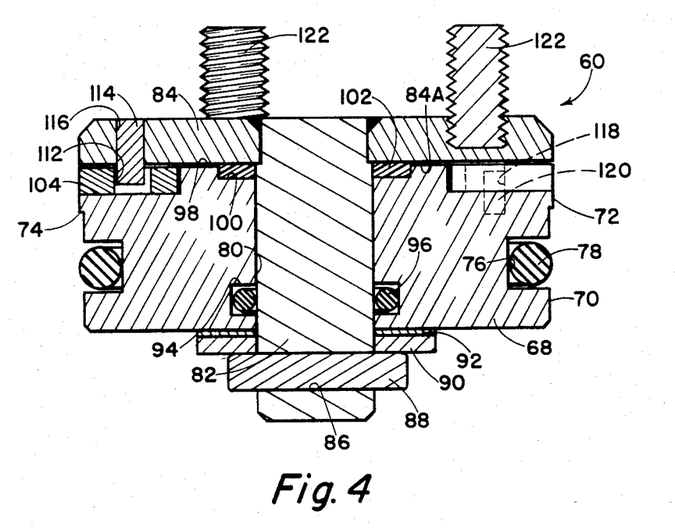
FIG. 4 is a cross-sectional view of the plugging apparatus.
Figure 5:
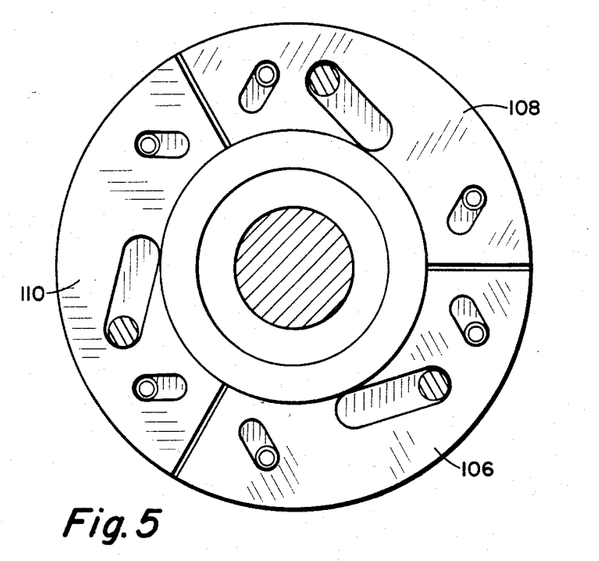
FIG. 5 is a cross-sectional view taken along the line 5—5 of FIG. 4 showing of the plugging apparatus in the retracted or non-operating condition.
Figure 6:
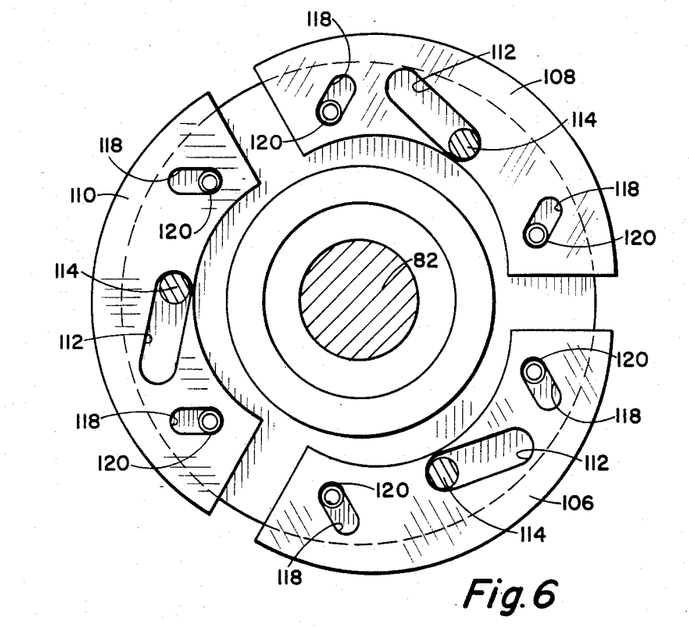
FIG. 6 is a view as in FIG. 5 but showing the segment member moved outwardly as the apparatus is employed in operation to close a cylindrical opening.

For a better illustration of the removable plugging apparatus, reference will now be had to FIGS. 4, 5 and 6. The apparatus 60 is formed of a cylinindrical body 68 having a cylindrical exterior surface 70 of a diameter slightly less than the internal diameter of the opening 18 in the first tubular member 14. The upper end of the body 68 has a slightly enlarged external circumferential area 72 providing a ledge 84 which, when the plugging apparatus is placed in the member 14 rests, on ledge 64.

Formed in the body cylindrical surface 70 is a groove 76 receiving an O Ring gasket 78 so that when the plugging member is placed in the opening 18 it is sealed against passage of fluid therethrough.

The body 18 has an axial opening 18 therethrough receiving a shaft 82 having attached at its upper end, a cylindrical drive plate 84. Plate 84 and shaft 82 are rotatable relative to body 62. To retain these members in engagement with the body the shaft 82 has an opening 86 therethrough receiving a pin 88 which bears against a washer 90 and a bearing washer 92 which may be formed such as a nylon. The opening 80 in the body has an internal circumferential groove 94 receiving an O-ring gasket 96 to seal against the passage of fluid through the opening 80.

Formed in the upper surface 98 of body 68 is a flat circumferential groove 100 surrounding the opening 80 which receives a thrust washer 102 preferably formed of lubricative material such as nylon. Thus the drive plate 84 is rotatably supported relative to body 68 by means of shaft 80 and in a leakproof arrangement.

A circumferential reduced height ledge 104 is formed in the upper end of body 68 and receives a plurality (three being illustrated) of segment members 106, 108 and 110. While a minimum of two segment members would function to accomplish the purpose of the invention, the use of three or four such members is preferred. A larger number of members may also be used but without improving the overall effectiveness of the device and incurring additional expense of manufacture. The segment members 106, 108 and 110 are of thickness less than the spacing between ledge 104 and the bottom surface 84A of the drive plate so that the segment members can be radially inwardly and outwardly positioned relative to the body member 68 and drive plate 84. Each of the segment members 106, 108 and 110 has a drive slot 112 therein, each drive slot being disposed at an angle to a radius of the body 68 cylindrical axis which is also the cylindrical axis of shaft 82. Received within each of the drive slots 112 is a drive pin 114 which extends from the drive plate 84. Each drive pin 114 is preferably received in an opening 116 formed in plate 84.

When plate 84 is rotated relative to body 68, drive pins 114 serve to radially outwardly extend or radially inwardly retract the segment member 106, 108 and 110. In FIG. 6 plate 84 has been rotated to outwardly extend the segment members, and in FIG. 5 the segment members are retracted. FIG. 5 shows the condition in which the plugging apparatus 60 may be inserted into or removed from tubular flange member 14. FIG. 6 shows the position of the segment members when used to retain the plugging apparatus in position. It can be seen that in FIG. 1 the segment members 106 and 110 are outwardly extended into groove 66 so that the plugging apparatus is held in position against pressure either internally or externally of pipeline 10.

Formed in the segment members to either side of and spaced from the drive slot 112 are alignment slots 118.

The alignment slots 118 are parallel to each other and are parallel to a radius of the body longitudinal axis extending at the mid-point between the alignment slots. Received in each of the alignment slots is an alignment pin 120 which extends from body 68. The alignment slots 118 and pins 120 serve to keep the segments 106, 108, 110 moving radially inwardly and outwardly in response to force applied by the drive pins 114 as the drive plate 84 is rotated.

Affixed to the drive plate 84 are studs 122 which are employed in inserting or removing the plugging apparatus.

In utilizing the apparatus of this invention it can be assumed that the first tubular flange member 14 is in position on a tubular member 12 extending from pipeline 10. With the plugging apparatus 60 in position fluid cannot flow into or out of the pipeline. If it is necessary to insert some implement into the pipeline 10, such as to close it off, the apparatus of this invention may be employed by installing the second tubular member 28 with its attached alignment plate 40, utilizing the clamp ring assembly 50A and 50B. Apparatus which then may be used to function within the interior of the second tubular member 28 may be attached to flange 40, such apparatus not being illustrated since it is a known technique employed in the pipeline industry. To provide access to the interior of the pipeline a mechanism may be inserted within such apparatus to engage studs 122. Drive plate 84 may then be rotated, retracting the segments 106, 108, 110 and the plug apparatus 60 removed. An implement (not shown) may then be extended within the pipeline 10, or other activities carried on using the munication provided with the interior of the pipeline. When such activities requiring access to the interior of the pipeline are completed, the plugging apparatus 60 may again be inserted into position and the upper plate rotated to extend the segment members so that it is held in position. Thereafter the second tubular member 28 and any implements attached to it can be removed by removing the clamp ring assembly. It can be seen that if additional closure securing is required, a closed flange having circumferential configuration such as that of the second tubular flange portion 30 may be employed and held into position by the clamp ring assembly 50A and 50B. In this manner access to the interior of a pipeline can be achieved when necessary without admitting any significant fluid from outside the pipeline to the interior of the pipeline or without permitting fluid within the interior of the pipeline to escape to the exterior.

Figure 7:
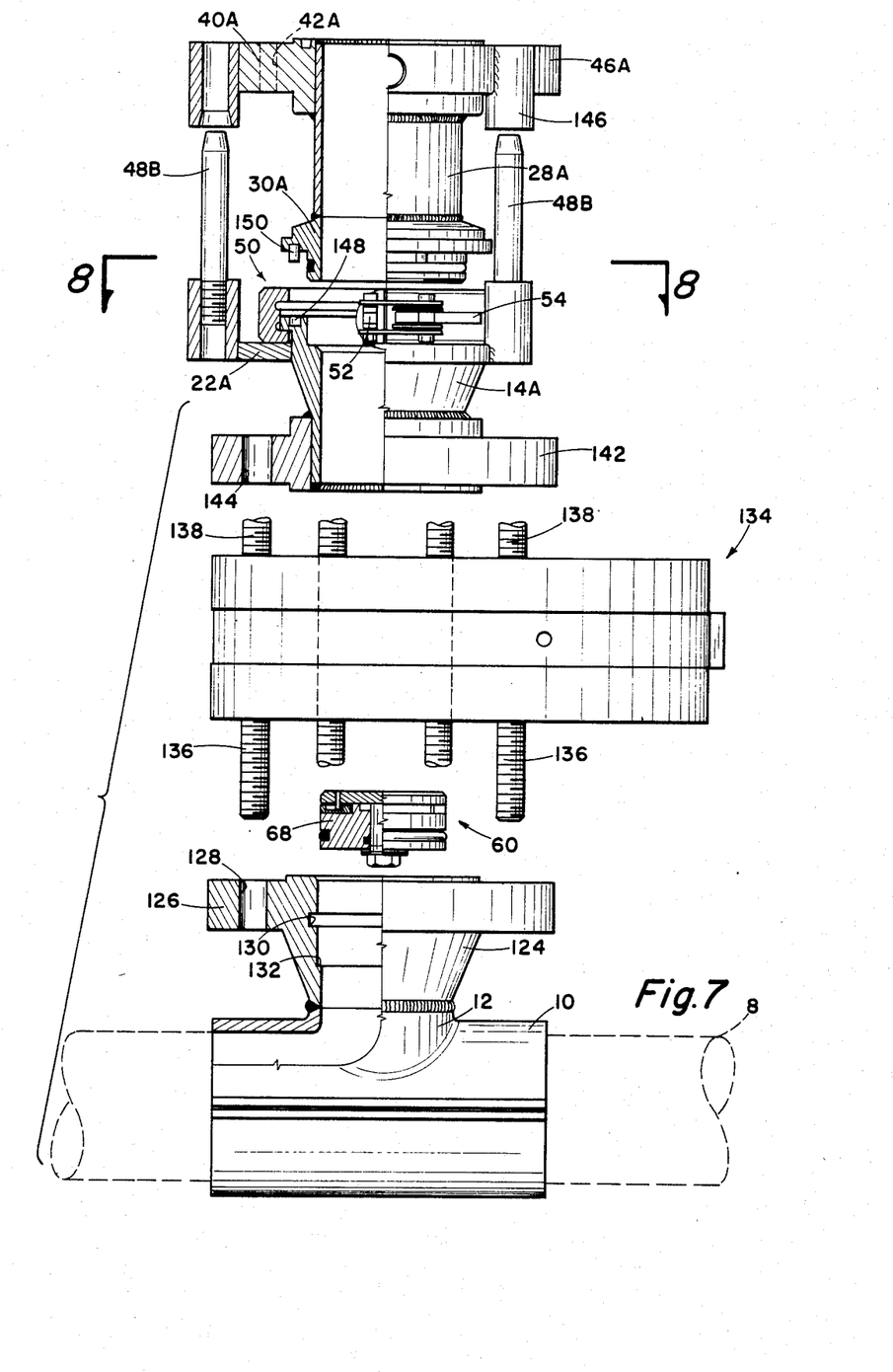
FIG. 7 is an exploded elevational view, shown partially in cross-section, of a preferred embodiment of the invention.
Figure 8:
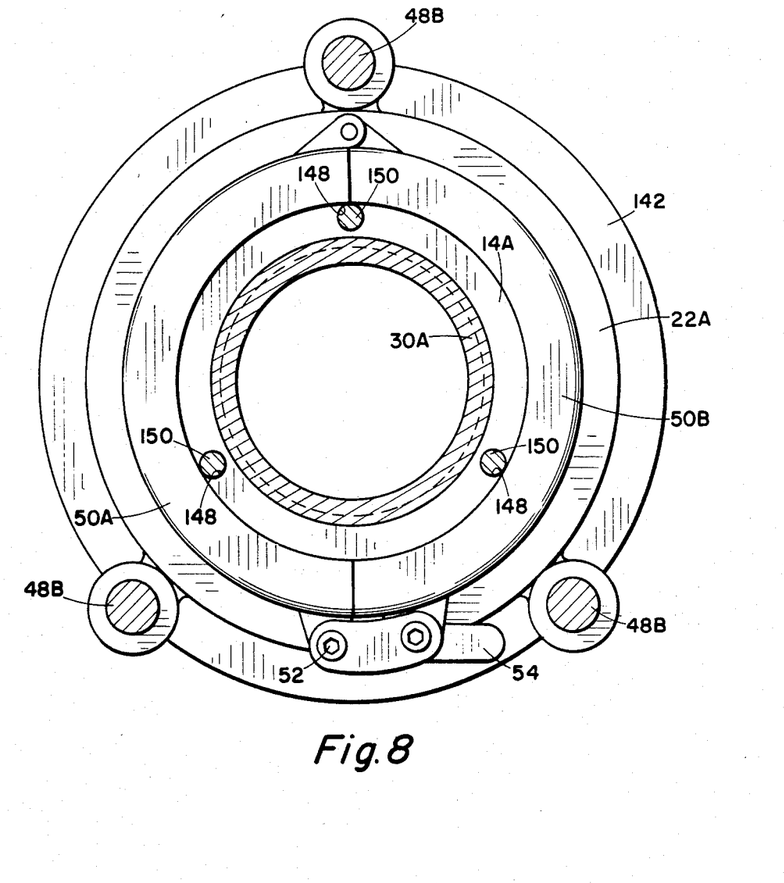
FIG. 8 is a cross-sectional view taken along the line 8—8 of FIG. 7.

Referring to FIGS. 7 and 8 an alternate embodiment of the invention and one which is preferred for reasons which will be explained but which incorporates the principles of the invention described with respect to FIGS. 1 through 6. The saddle member 10 is affixed to pipe 8 by welding as previously has been described, the saddle member having a tubular extension 12. Welded to the tubular extension is a standard ANSI flange. This type of flange is one which is readily commercially available and is used in the petroleum industry to attach fittings to a vessel, a pipeline and so forth. The flange has an integral radially extending portion 126 having openings 128 therein for receiving bolts so that different items may be attached to it. The ANSI flange 124 is modified internally to provide an internal circumferential groove 130 and an internal circumferential ledge 132. This enables the flange to receive the removable plugging apparatus 60 as previously described. The ledge 122 receives the lower end of the cylindrical body 68 of the plugging apparatus which functions in the manner as previously described with reference to FIGS. 3, 4, 5 and 6.

In the typical application of the invention the saddle member 10 is first secured to pipe 8 and a standard sandwich valve 134 is bolted in place on flange 124. The sandwich valve has bolts 136 which are received in openings 128 in the flange so that it is sealably secured. The sandwich valve also has upwardly extending bolts 138 which receives an adapter flange 140, the adapter flange having a standard radio flange portion 142 with openings 144 to receive the upwardly extending bolts 138 from the sandwich valve. The tubular flange 14A has the substantially the same upper internal and external configuration as the flange 14 previously described and receives around it the clamp assembly 50 which includes the hinge 52 and toggle mechanism 54.

The alignment plate 22A affixed to the flange 14A is shown arranged to form the obverse function as compared to the alignment plate 22 of FIG. 1 that is, instead of having openings receiving the bars 48B, plate 22A supports the bars which extend in planes parallel the plane of the flange tubular axis. The toggle plate 22A is arranged so that the bars 48B are unequally spaced meaning that the second tubular member 28A will engage the tubular flange 14A in only one orientation. This is achieved by a provision of tubular members 146 received on the flange 40A in spaced arrangement to coincide with the pattern of bars 48B.

The upper end of flange portion 14A includes spaced apart recesses 148 (three being shown) which receive pins 150 extending downwardly from the second tubular flange portion 30A. These serve to retain the flange portions 14A and 28A together in a non-rotatable arrangement so that if a machine is attached to the upper end of the flange portion 28A which would otherwise tend to cause it to rotate, such as a boring machine, the members will be held in a non-rotatable position.

The embodiment of FIGS. 7 and 8 of the invention is the preferred embodiment since when an operation on a pipeline is completed it leaves affixed to the pipeline a standard ANSI type flange 124 with the standard radio portion 126 adapted to receive any other apparatus equipped with the standard flange. The embodiment of FIGS. 1 through 3 functions completely satisfactorily except it leaves attached to pipeline 8 when operations are completed a non-standard type flange which can accept only an apparatus such as held in position by the clamp ring 50.

The method of use of the embodiment shown in FIGS. 7 and 8 is as follows. First, the saddle member 10 is welded to the exterior of a pipe 8. The sandwich type tapping valve 134 is bolted into position on the flange radio portion 126. Next the valve adapter flange 114A is bolted into position on the sandwich tapping valve. Lead 10 with extension tabs (not shown) are employed with the sandwich tapping valve and valve adapter connection so that the lead 10 tabs are in line with the valve adapter tab and centered over the pipeline in the direction for which stoppling is desired.

Next the tapping machine which is secured to the upper flange 28A is installed on the adapter flange 14A and the machine can be installed in only one orientation because of the bars 48B and tubular members 146, thus insuring that the tapping machine is correctly oriented with respect to pipeline 8.

After tapping is completed, that is a hole is formed in the pipeline 8 through the tubular portion 12 and the saddle member 10, the tapping machine is withdrawn by closing the sandwich valve 134. After the tapping machine is withdrawn a stopple with the adapter flange 28A affixed to it may be installed on adapter flange 14A, the bars 48B and tubular members 146 again insuring that the stopple will be correctly oriented with respect to pipeline 8. The stopple operation may then be completed to block flow of fluid through pipeline 8, allowing repairs or alterations to be made to it.

After these operations are completed the removeable plugging apparatus 60 may be inserted in place within flange 124. After which the sandwich valve 34 may be removed and, for security purposes, the flange 124 may be covered with a standard blind flange employing bolts extending through openings 128. In this manner an entire drilling operation to provide an opening in the sidewall of pipeline 8, the closing off of the pipeline, and the removal of equipment necessary to close it off can be consummated wherein the correct orientation of the equipment employed to do such work is assured, even in areas of limited visibility.

While the invention has been described with a certain degree of particularity it is manifest that many changes may be made in the details of the construction and the arrangement as composed without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A quick coupling tubular connector having means for precise rotational alignment, comprising:
    a first tubular flange member having an open end and having an enlarged integral external circumferential lip portion adjacent said open end;
    a first alignment plate affixed to the exterior peripheral surface of said first tubular flange member and spaced from said circumferential lip portion, said lip portion being between said first alignment plate and said first flange member open end, the first alignment plate having at least one opening therein adjacent the plate peripheral edge;
    a second tubular flange member having an open end and having an enlarged integral external circumferential lip portion adjacent said open end;
    a second alignment plate affixed to the exterior peripheral surface of said second tubular flange member and spaced from said circumferential lip portion, said lip portion being between said second alignment plate and said second flange member open end;
    at least one alignment bar extending from said second alignment plate adjacent the periphery thereof, each alignment bar extending parallel the tubular axis of said second tubular flange member and being receivable within a said opening in said first alignment plate whereby when said open ends of said first tubular flange member and said second tubular flange member are engaged, said alignment plates and alignment bars insure precise preselected rotational alignment of said tubular flange members, the alignment plate and alignment bar being dimensioned and positioned such that the alignment bar is displaced away from said lip portions of said first and second alignment plates; and
    a clamp member having a C-shaped cross-sectional configuration for removably mating around said tubular flange member circumferential lip portions to secure said flange members together.

2. A quick coupling connector of tubular members according to claim 1 wherein said second tubular flange member includes a reduced external diameter integral extending portion having a circumferential groove therein, and wherein said first tubular flange member has an increased internal diameter portion at said open end dimensioned to telescopically receive said second flange member extending portion, and including:
    an O-ring seal received in said groove in said extending portion which seals against said first flange member increased internal diameter portion when said flanges are coupled to each other.

3. An adapter flange connection according to claim 1 wherein at least one of said alignment plates is in the form of a flange providing means for sealed connection with another member.

* * * * *